United States Patent [19]

Foster

[11] Patent Number: 5,433,312

[45] Date of Patent: Jul. 18, 1995

[54] DRIVE ASSEMBLY FOR CONVEYOR SLATS OF RECIPROCATING FLOOR CONVEYOR

[76] Inventor: Raymond K. Foster, P.O. Box 1, Madras, Oreg. 97741

[21] Appl. No.: 327,015

[22] Filed: Oct. 21, 1994

[51] Int. Cl.$^6$ ............................................. B65G 25/00
[52] U.S. Cl. ................................................. 198/750.5
[58] Field of Search ...................... 198/750; 414/525.1

[56] References Cited

U.S. PATENT DOCUMENTS

| | | | |
|---|---|---|---|
| 4,709,805 | 12/1987 | Foster | 198/750 |
| 4,748,893 | 6/1988 | Foster | 91/176 |
| 4,793,469 | 12/1988 | Foster | 198/750 |
| 4,899,870 | 2/1990 | Foster | 198/750 |
| 4,907,691 | 3/1990 | Foster | 198/750 |
| 4,966,275 | 10/1990 | Foster | 198/750 |
| 5,092,732 | 3/1992 | Foster | 198/750 X |
| 5,165,524 | 11/1992 | Foster | 198/750 |
| 5,355,995 | 10/1994 | Foster | 198/750 |

*Primary Examiner*—D. Glenn Dayoan
*Attorney, Agent, or Firm*—David P. Campbell

[57] ABSTRACT

A reciprocating floor conveyor comprising a support frame (12), a plurality of elongated conveyor slats (?), a plurality of drive motors (40), one for each conveyor slat, for reciprocating the conveyor slats, and a set of lugs (86,100) and contact blocks (90) for maintaining contact between the drive motors (40) and conveyor slats (CS) should the conveyor slats move relative to the drive motors. The drive motors are mounted on the support frame beneath the conveyor slats. Each conveyor slat (CS) and drive unit (40) includes a set of longitudinally-spaced lugs (86,100). The conveyor slat lugs and drive unit lugs are alternately spaced apart in substantial longitudinal alignment. A set of contact blocks (90) is provided for each drive unit. Each contact block (90) is positioned between and in engagement with an adjacent pair of conveyor slat and drive unit lugs. Each contact block is movable toward and away from a conveyor slat. As the drive motors reciprocate the conveyor slats, should a conveyor slat move relative to its drive unit, the contact blocks move to maintain engagement between the contact blocks and adjacent conveyor slat and drive unit lugs.

14 Claims, 7 Drawing Sheets

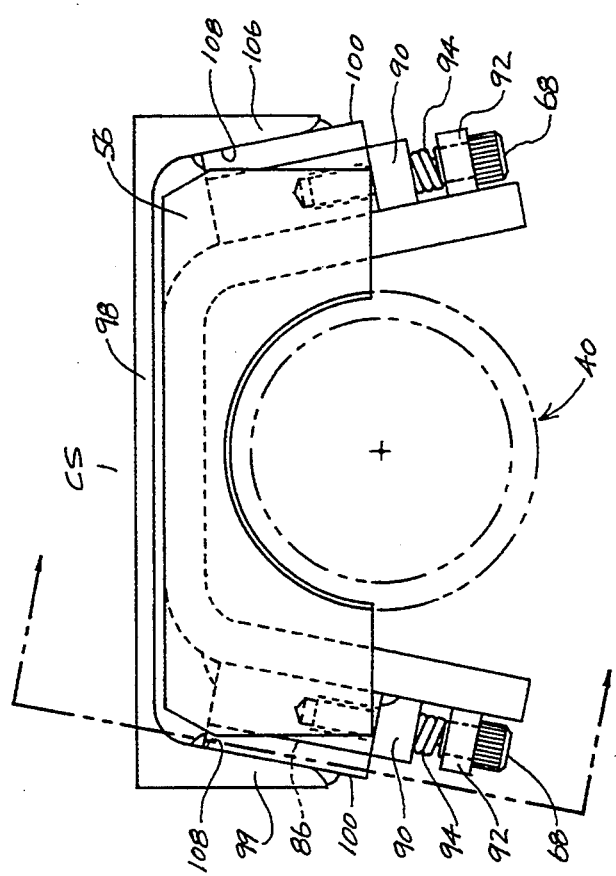
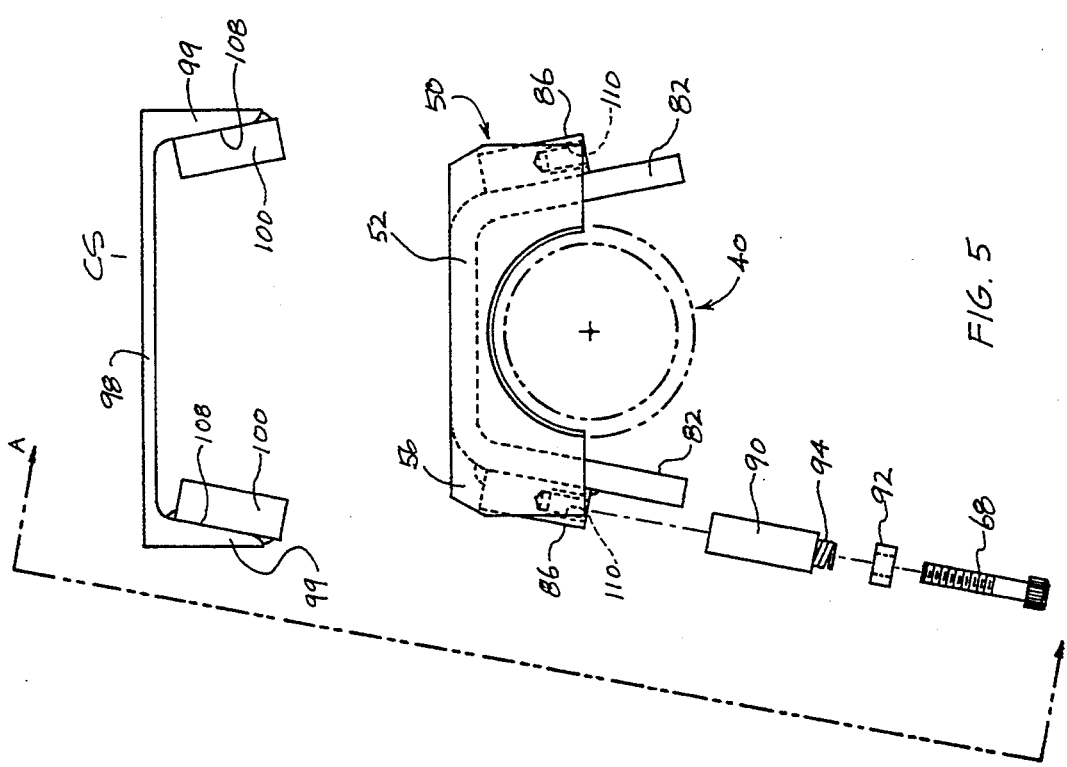
FIG. 6
FIG. 5

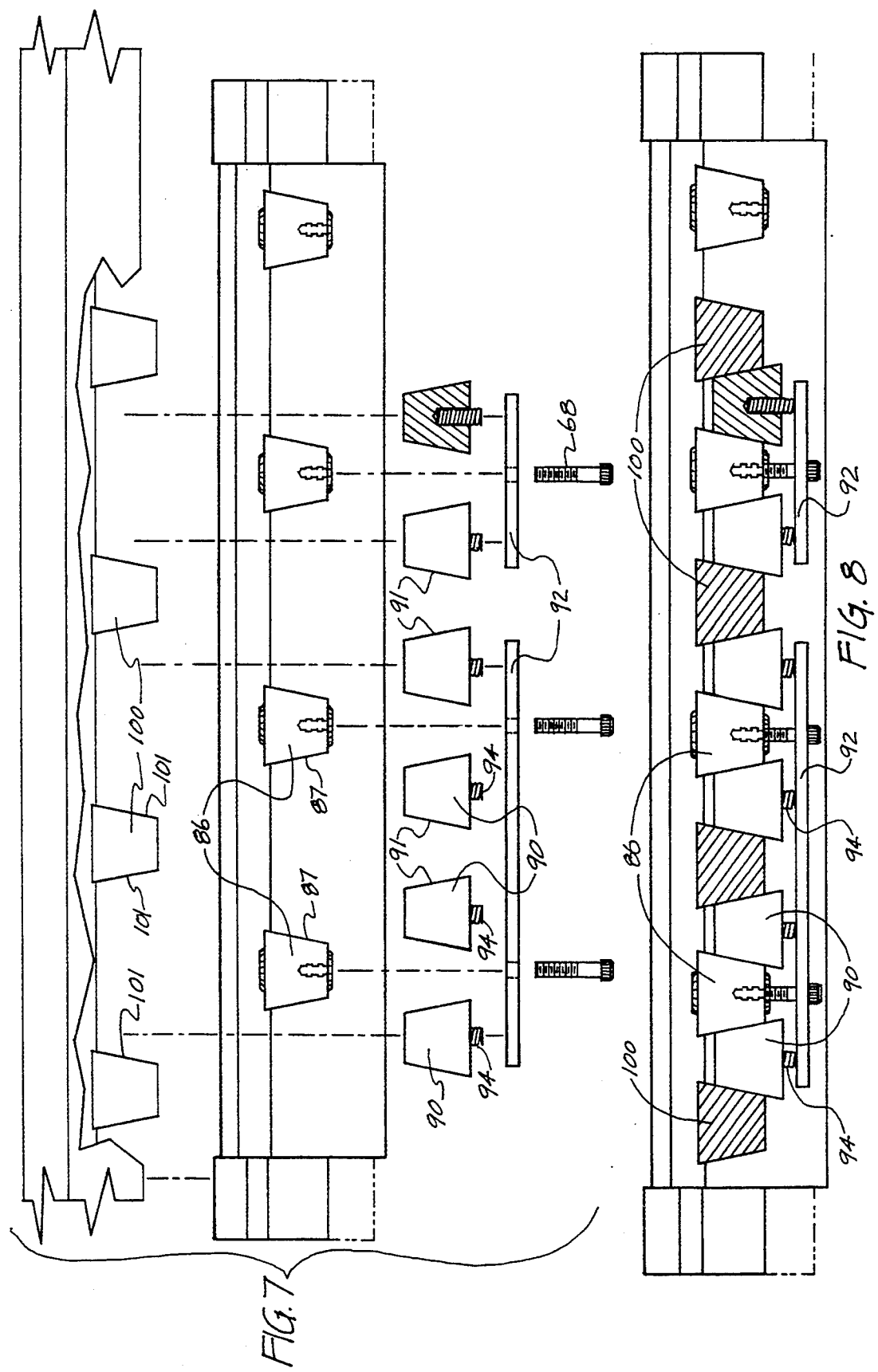

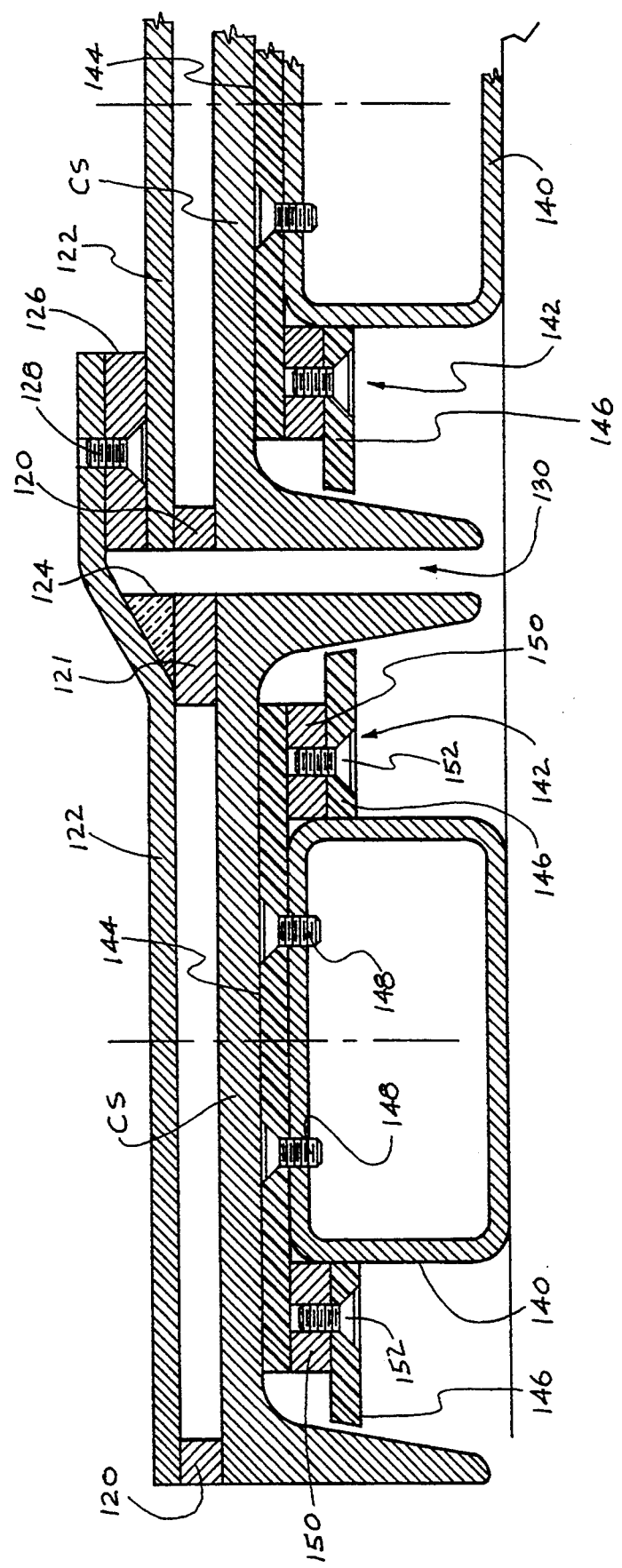

DRIVE ASSEMBLY FOR CONVEYOR SLATS OF RECIPROCATING FLOOR CONVEYOR

TECHNICAL FIELD

The present invention relates to reciprocating floor conveyors, and more particularly, to drive unit assemblies for reciprocating conveyor slats of reciprocating floor conveyors.

BACKGROUND OF THE INVENTION

Reciprocating floor conveyors that are used to convey light to moderately heavy loads typically comprise an array of conveyor slats spanning the width of the conveyor, and a few slat drive units mounted beneath the conveyor slats. Each drive unit reciprocates three or more conveyor slats, usually by means of a transverse drive beam, which couples each drive unit to several conveyor slats. Numerous U.S. patents have issued that disclose designs for such transverse drive beam systems. The following are some illustrative examples of my prior U.S. patents: U.S. Pat. Nos. 4,709,805, granted Dec. 1, 1987; 4,748,893, granted Jun. 7, 1988; 4,793,469, granted Dec. 27, 1988; and 5,165,524, granted Nov. 24, 1992.

Inherent torque limitations in a transverse drive beam design can limit the payload weight of a conveyor. For heavier loads, such as, for example, loads in the range of 100,000 to 150,000 pounds, it can become necessary to increase the number of drive units per conveyor slat. Yet, where heavy loads are conveyed by a reciprocating floor conveyor, the wear and tear on the drive unit assemblies can increase, sometimes dramatically. Thus, it becomes complex to design a reciprocating floor conveyor for conveying heavy loads that is durable, yet relatively inexpensive to manufacture and easy to install, maintain, and repair. The present invention is directed to such a reciprocating floor conveyor.

In addition, when heavier loads are carried by reciprocating floor conveyors, the conveyor slats tend to flex and rise off of the drive units. Also, the conveyor slats can move laterally, as well as lengthwise, relative to the drive units. This relative movement between the slats and their drive units can cause problems at the mechanical connections between the two, and this relative movement tends to increase as the weight of the load increases. The present invention also is directed to alleviating any problems caused by relative movement between the conveyor slats and drive units.

For background purposes, reference is made to my prior U.S. Pat. No. 4,899,870, which discloses different methods of connecting conveyor slats to drive members with a quick-release design.

DISCLOSURE OF THE INVENTION

Briefly described, the reciprocating floor conveyor of the present invention comprises a support frame, a plurality of elongated conveyor slats, a plurality of drive units, one for each conveyor slat, for reciprocating the conveyor slats, and a set of lugs and contact blocks for maintaining contact between the drive units and conveyor slats should the conveyor slats move relative to the drive units. The elongated conveyor slats are carried on the support frame for longitudinal, reciprocating movement between "start" and "advanced" positions. The drive units are mounted on the support frame beneath the conveyor slats. Each conveyor slat and drive unit includes a set of longitudinally-spaced lugs. The conveyor slat lugs and drive unit lugs are alternately spaced apart in substantial longitudinal alignment between the conveyor slat and drive unit. The contact blocks are positioned between and in engagement with adjacent pairs of conveyor slat and drive unit lugs. Each contact block is biased upwardly so that it is movable toward and away from a conveyor slat. As the drive units reciprocate the conveyor slats, should a conveyor slat move relative to its drive unit, the contact blocks move to maintain engagement between the contact blocks and adjacent conveyor slat and drive unit lugs.

Preferably, each conveyor slat lug and drive unit lug includes downwardly-angled block engagement surfaces, and each contact block includes upwardly-angled lug engagement surfaces. These engagement surfaces are designed to maintain engagement between the contact blocks and conveyor slat and drive unit lugs if there is relative movement between a conveyor slat and its corresponding drive unit.

According to an aspect of the invention, each drive unit includes a hydraulic motor and a drive shoe assembly mounted to the motor. The contact blocks are carried by the drive shoes. In addition, each drive unit includes a coil spring for each contact block to bias the contact block upward into engagement with the block engagement surfaces of the conveyor slat and drive unit lugs. The contact blocks and coil springs are carried by a bar mounted to the drive unit lugs.

Using contact blocks and matching lugs between the hydraulic motors and conveyor slats allows dimensional tolerances for the hydraulic motor location and conveyor slat location to be increased. The ability of the contact blocks to move between the conveyor slat and drive unit lugs allows for positional changes between the hydraulic motor and the conveyor slat while maintaining a positive engagement between each motor and slat. Positional changes between the hydraulic cylinder and conveyor slat can occur vertically, as well as in the transverse and longitudinal alignment of the hydraulic cylinder and conveyor slat.

The ability to maintain a positive mechanical engagement between the hydraulic motors and the conveyor slats as the motors move relative to the slats has several advantages. First, hydraulic motors are mounted in a rigid manner to the drive frame, which is mounted to the support framework of the conveyor. The drive frame is dimensionally related to the conveyor slat locations. By having flexibility in the hydraulic motor and conveyor slat mechanical connections, the drive frame installation location and alignment becomes much less critical, making it easier to manufacture and install the components. Second, in operation, the conveyor slats can flex or move up and down, sideways, and longitudinally, while maintaining a positive mechanical connection with the drive units.

The present design also allows the conveyor slats to be carried on the support frame without mechanical fasteners. The conveyor slats are guided by guide beams as they reciprocate, but are not positively held down by the support frame. Consequently, the conveyor slats can be removed from the conveyor frame by simply lifting the conveyor slats off the guide beams, which disengages the contact blocks. Setting the conveyor slats back down on the conveyor allows for re-engagement of the contact blocks.

These and other advantages and features will become apparent from the following detailed description of the best mode for carrying out the invention and the accompanying drawings, and the claims, which are incorporated herein as part of the disclosure of the invention.

BRIEF DESCRIPTION OF THE DRAWINGS

Like reference numerals are used to indicate like parts throughout the various figures of the drawing, wherein:

FIGS. 5 and 6 are exploded and assembled end views, respectively, of the conveyor slat drive units and conveyor slats of FIG. 4;

FIG. 7 is an exploded side view of the conveyor slat drive units of FIG. 4, shown with part of the conveyor slat cut-away to reveal the conveyor slat lugs on inner sides of the conveyor slat, and also shown with one contact block in cross-section;

FIG. 8 is an assembled view of the components of FIG. 7, taken along the line 8—8 of FIG. 6, and shown with one of the contact blocks in cross-section;

FIG. 9 is a sectional view of a conveyor slat and guide beam and bearing assembly, taken along the line 9—9 of FIG. 2;

BEST MODE FOR CARRYING OUT THE INVENTION

Figure 1:
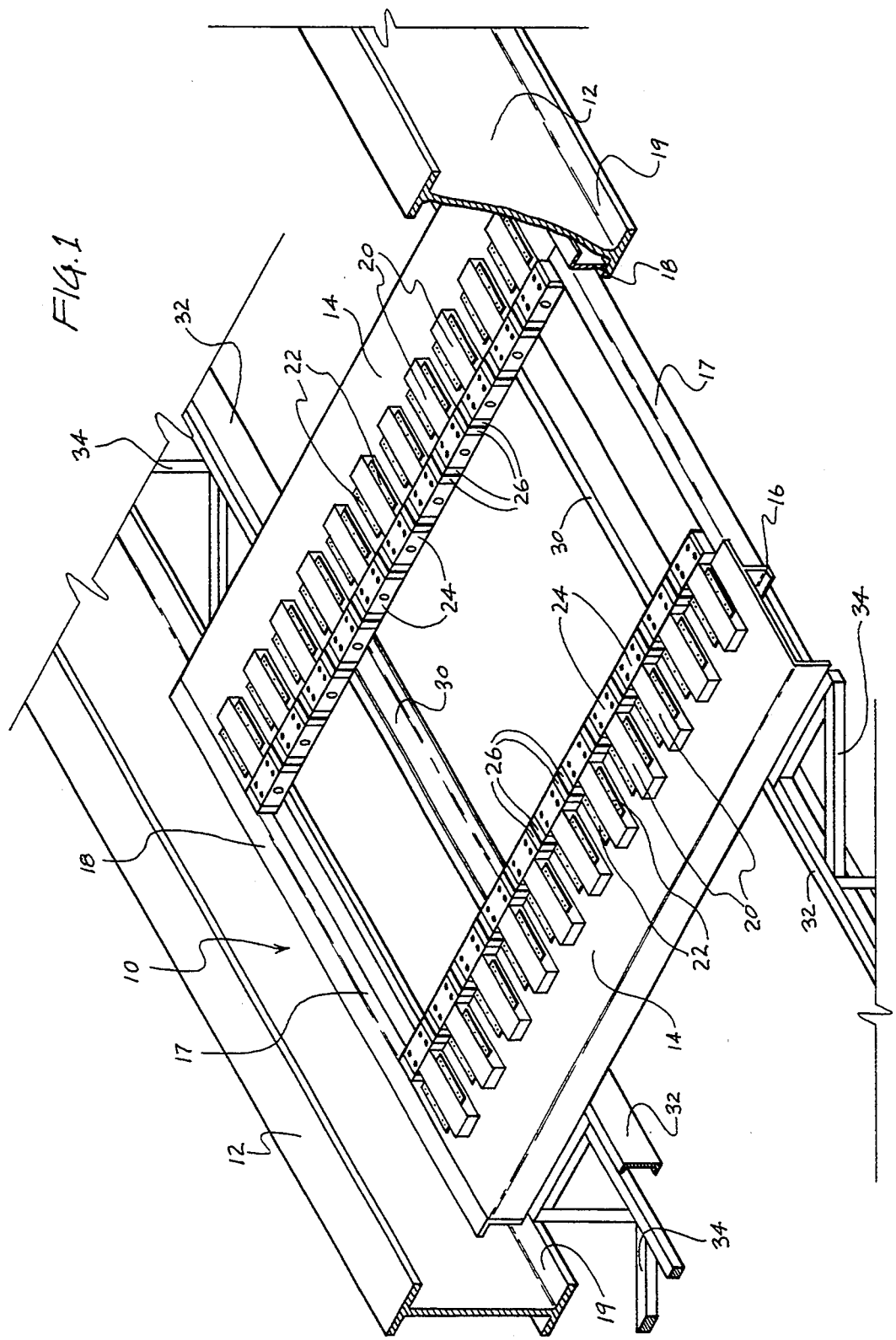
FIG. 1 is an isometric view of a drive frame assembly for the conveyor slat drive units of the present invention.

Referring now to the drawings, FIG. 1 depicts a drive frame assembly 10 mounted between a pair of main trailer I-beams 12. I-beams 12 comprise the main structural members of a trailer having a container mounted thereon for hauling waste material. However, the particular material carried by the reciprocating floor conveyor of the present invention forms no part of the invention.

Reciprocating floor conveyors are known by those skilled in the art to include a plurality of elongated conveyor slats slidably mounted to reciprocate between "start" and "advanced" positions. My prior U.S. Pat. No. 4,793,469, issued Dec. 27, 1988, entitled "Reduced Size Drive/Frame Assembly for a Reciprocating Floor Conveyor," discusses many of the basic operational features of reciprocating floor conveyors. The conveyor slats of the present invention are carried, at least partially, by drive frame assembly 10.

Drive frame assembly 10 includes a pair of formed stiffener cross plates 14 mounted on cross channel beams 16 (only one of which is shown). Formed side angles 17 join channel beams 16 and stiffener plates 14 to form the major components of the rectangular drive frame assembly 10. Drive frame assembly 10 is mounted to angle brackets 18, which are mounted on the lower inner flanges 19 of I-beams 12, as by welding.

1" by 2" guide tube segments 20 are mounted on stiffener plates 14 and spaced laterally across plates 14 equi-distance from each other. Each guide tube 20 has a pair of upper flange bars 22 secured at the upper edges of guide tubes 20. Flange bars 22 receive bearing plates (not shown), on which the conveyor slats reciprocate. A ball block 24 is mounted to the inner end of each guide tube 20. Ball blocks 24 form the subject matter of my prior U.S. patent application Ser. No. 8/054,533, filed Apr. 28, 1993, and entitled "Ball block for Mounting Linear Motor." Ball blocks 24 include spacer rails 26, which abut adjacent spacer rails and are welded thereto. Longitudinal channel beams 30 are secured underneath stiffener plates 14 and lateral channel beams 16. Longitudinal channel beams 30 are secured to extension beams 32, which extend approximately six feet beyond each end of drive frame assembly 10. Diagonal bracing tubes 34 are secured between I-beams 12 and longitudinal channel beams 30 and extension beams 32 for reinforcement of drive frame assembly 10.

Figure 2:
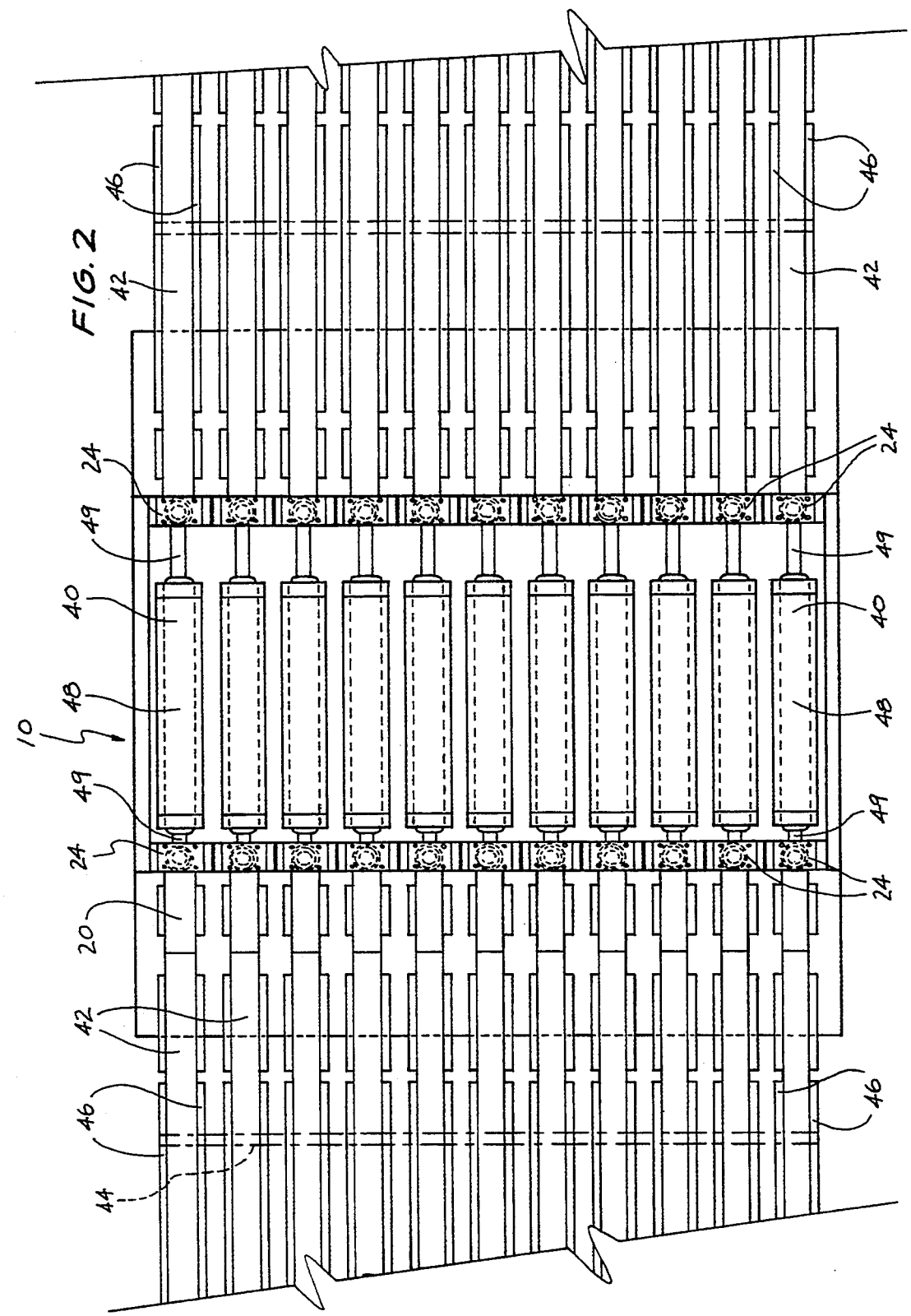
FIG. 2 is a partial plan view of a reciprocating floor conveyor with the conveyor slat drive units of the present invention shown installed in the drive frame assembly of FIG. 1.

FIG. 2 shows slat drive motors 40 mounted between ball blocks 24. Drive motors 40 are discussed in more detail in my prior U.S. Pat. No. 4,793,469. Drive motors 40 are slightly modified from the drive motors disclosed in my '469 patent, the modifications being discussed with reference to FIG. 4. Also shown in FIG. 2 are elongated, conveyor slat tubular guide beams 42 mounted on cross beams 44. Cross beams 44 mount between the main I-beams of the conveyor, and together with drive frame assembly 10 form a support structure or frame for the conveyor slats. Guide beams 42 include flange bars 46, similar to flange bars 22 of guide tube segments 20.

Drive motors 40 include a cylinder 48 and a piston rod 49. Cylinder 48 reciprocates on piston rod 49 between ball blocks 24. Each conveyor slat is coupled to a cylinder 48. A hydraulic control system operates to reciprocate cylinders 48 in unison to move the conveyor slats and convey a load along the conveyor. Cylinders 48 then retract sequentially to reposition the conveyor slats. The hydraulic connections and control components for drive motors 40 are not shown and do not form a part of the present invention. Reference is made to my aforementioned '469 patent for disclosure of suitable hydraulic controls.

Figure 3:
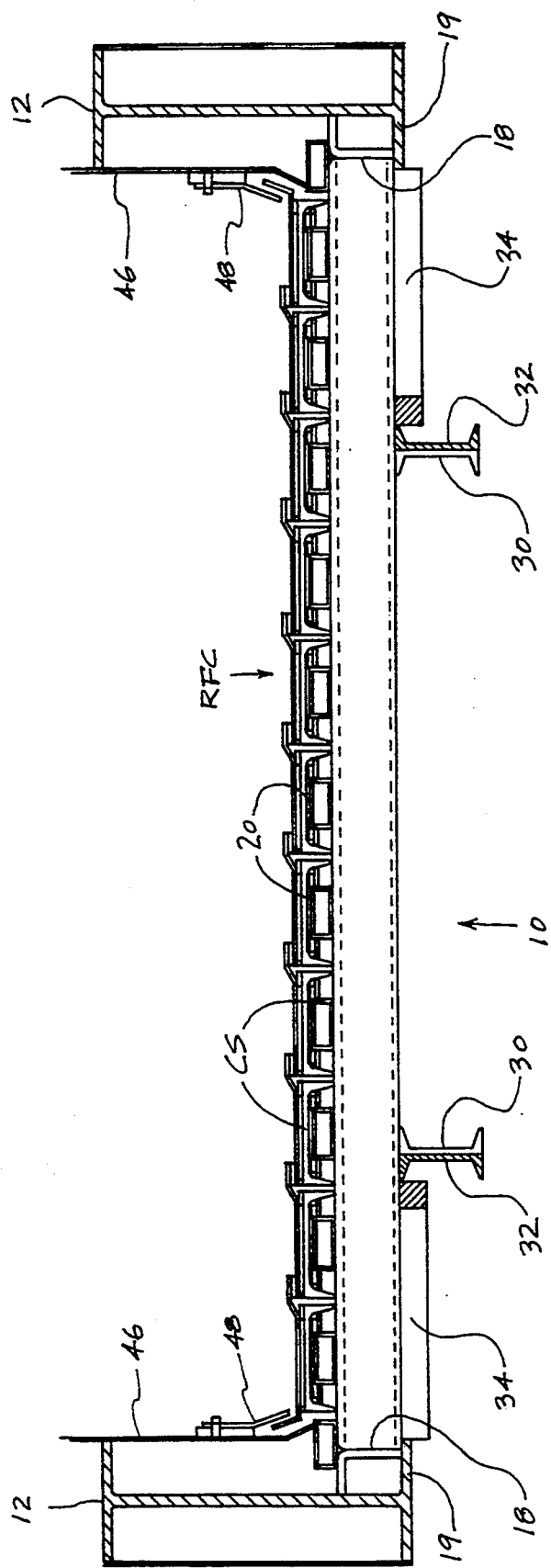
FIG. 3 is an end view of the drive frame assembly and conveyor slats of the present invention.

In FIG. 3, drive frame assembly 10 is shown mounted between main I-beams 12 via angle brackets 18 and resting on inner flanges 19 of I-beams 12. Diagonal bracing 34 reinforces drive frame assembly 10, as does longitudinal channel beams 30 and extension beams 32. The reciprocating floor conveyor RFC is shown positioned above drive frame assembly 10 and between main I-beams 12. The conveyor slats CS of reciprocating floor conveyor RFC are slidably carried on guide tube segments 20. The reciprocating floor conveyor RFC also includes side walls 46 and side wall overlay plates 48.

Figure 4:
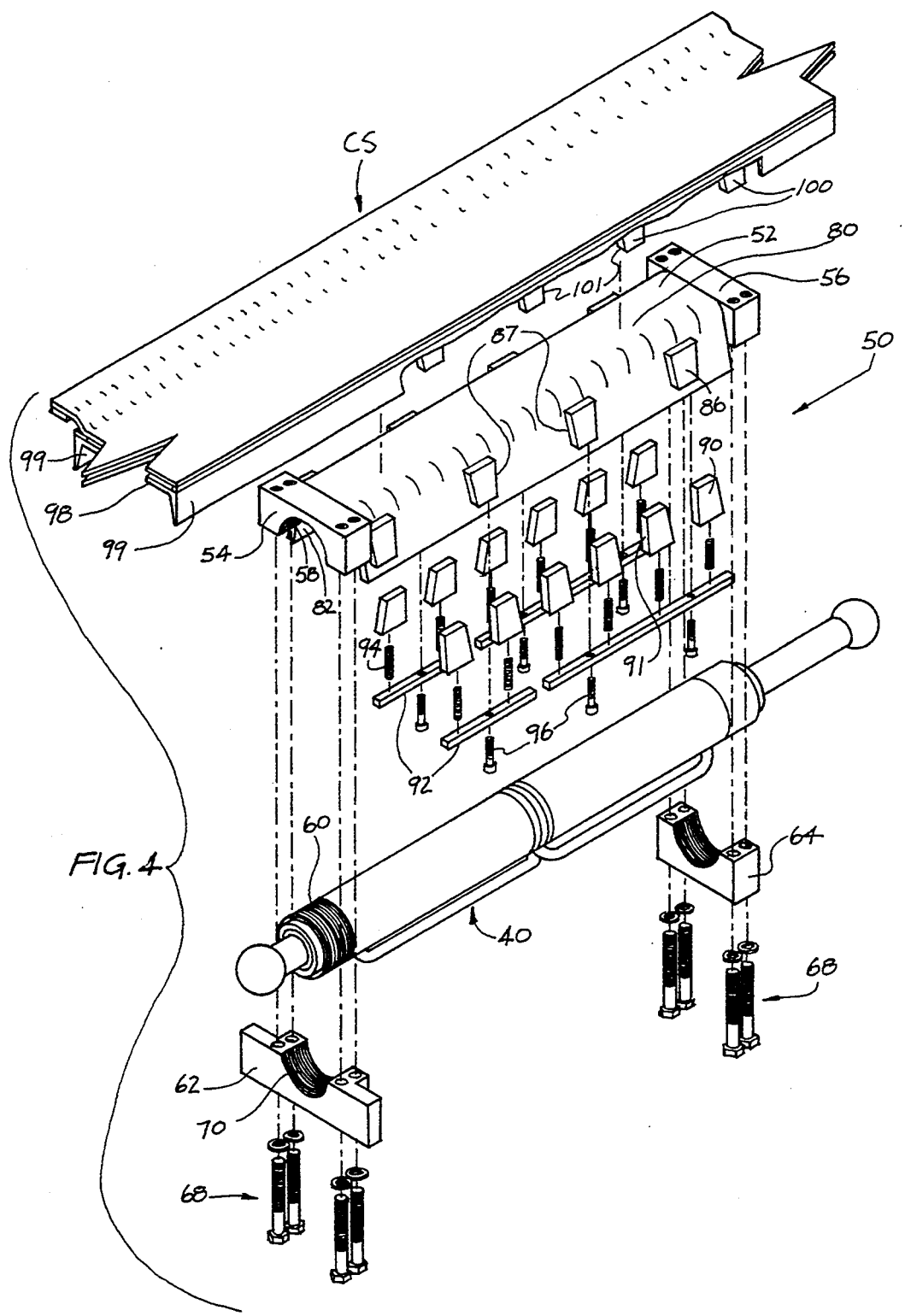
FIG. 4 is a pictorial view of the conveyor slat drive units of FIG. 2, shown in combination with a partial section of a conveyor slat.

In FIG. 4, a drive shoe assembly is depicted by reference 50. Drive shoe assembly 50 couples each drive motor 40 to its corresponding conveyor slat CS, a portion of which is shown in the figure. Drive shoe assembly 50 includes an elongated inverted U-shaped shell 52 having an upper half clamp block 54, 56 secured at each end. Upper clamp block 54 includes grooves 58 that mate with grooves 60 at one end of drive unit 40. A pair of lower clamp blocks 62, 64 are thread-mounted to upper clamp blocks 54, 56 by means of threaded bolts 68. Lower clamp block 62 also includes grooves 70, which mate with grooves 60 on drive unit 40. Grooves 58, 60, 70 are not comprised of a single helical groove but rather adjacent grooves, and are provided to enhance the mechanical drive connection between shell 52 and motor 40. The non-grooved clamp blocks 56, 64 are not provided with similar grooves, but should an application warrant it, grooves could be provided on these clamp blocks, with mating grooves provided at the other end of drive motor 40.

Shell 52 includes a top portion 80 and a pair of depending side walls 82. A set of spaced-apart inverted trapezoidal drive unit lugs 86 are fixedly secured along the outer sides of side walls 82. Drive unit lugs include downwardly-angled block engagement surfaces 87. Drive shoe assembly 50 also includes a set of contact blocks 90, which are similar in shape to drive unit lugs 86. Contact blocks 90 include upwardly-angled lug engagement surfaces 91. When assembled, angled surfaces 87, 91 engage one another and transfer drive forces from motor 40 to conveyor slat CS. Contact blocks 90 are carried by elongated rods 92 and are biased upwardly by coil springs 94. Bolts 96 mount rods 92 to the undersides of drive unit lugs 86.

Conveyor slat CS includes a top portion 98 and a pair of side walls 99. A set of spaced-apart conveyor slat lugs 100, which are similar in shape to drive unit lugs 86, are fixedly secured to the inner sides of side walls 99. Conveyor slat lugs 100 also include downwardly-angled block engagement surfaces 101. Coil springs 94 bias contact blocks 90 upwardly against conveyor slat lugs 100, as well as against drive unit lugs 90.

Referring to FIG. 5, each side wall 99 of conveyor slat CS includes an inwardly angled inner surface 108, to which conveyor slat lugs 100 are secured. The angle of inner surfaces 108 is equal to the angle of side walls 82 of shell 52. The spacing between side walls 99 is such that drive shoe assembly 50 fits up underneath conveyor slat CS between side walls 99. As shown in FIG. 6, drive unit lugs 86 align longitudinally with conveyor slat lugs 100, and contact blocks 90 align with both sets of lugs 86, 100, so that longitudinal reciprocation of drive shoe assembly 50 directly transfers longitudinal reciprocation forces to conveyor slat CS.

Drive unit lugs 86 include threaded holes 110, which receive threaded bolts 68 and secure rods 92 to the drive unit lugs. Rods 92 carry coil springs 94, which bias contact blocks 90 upwardly against the conveyor slat lugs 100 and drive unit lugs 86.

Referring to FIGS. 7, 8, it can be seen that the spacing between conveyor slat lugs 100 is sufficient so that a drive unit lug 86 and two contact blocks 90 can fit between conveyor slat lugs 100. FIG. 8 illustrates how conveyor slat lugs and drive unit lugs 86 are alternately spaced from each other and aligned longitudinally with contact blocks 90. When the conveyor of the present invention is used to convey heavy loads, conveyor slats CS sometimes flex and rise up away from drive shoe assemblies 50. When this happens, contact blocks 90 move upwardly due to upward forces provided by coil springs 94. As contact blocks move upwardly with conveyor slats CS, angled surfaces 87, 101 of the lugs remain engaged with angled surfaces 91 of the contact blocks.

The design of the mechanical connection between drive shoe assembly 50 and conveyor slat CS provides for vertical, lateral, and longitudinal movement between the drive shoe assembly 50 and conveyor slat CS. For example, should a conveyor slat CS rise, conveyor slat lugs 100 will move away from the drive shoe assembly 50, contact blocks also rise due to the bias of springs 94. As contact blocks 90 rise, engagement is maintained between the contact blocks and the lugs 86,100, allowing drive motors 40 to reciprocate conveyor slats 50.

Conveyor slat CS shown in FIG. 9 is a water-cooled conveyor slat. Loads carried by the reciprocating floor conveyor can approach temperatures in the range of six hundred degrees or higher. Thus, it becomes necessary to cool the reciprocating floor conveyor in order to protect it. On top of each conveyor slat CS is mounted a pair of side strips 120, 121 at the lateral edges of the slat CS. A protective overlay plate 122 is mounted on side strips 120,121. Overlay plate 122 extends from side strip 120, over the conveyor slat CS, and over the other side strip 122, and then extends upwardly at an angle and then outwardly over an adjacent conveyor slat CS. Side strips 120, 121 and overlay plate 122 preferably are made of steel.

A silicone filler 124 is wedged between the upwardly angled segment of overlay plate 122 and side strip 121. Filler 124 prevents material from accumulating in the gap formed beneath overlay plate 122 and side strip 121. A plastic bearing strip 126 is secured beneath the outer segment of overlay plate 122 by means of screws 128. Bearing strip 126 prevents material from working its way between conveyor slats CS through gap 130 therebetween.

The drive shoe assembly is considered an important part of the present invention and can be used in combination with conveyor slats that do not have a water cooled jacket, as do the slats shown in some of the figures. However, should a water cooled jacket be used, appropriate ports should be provided at each end of the conveyor slats to introduce and exhaust the water into and from the jacket. Water cooled jackets, per se, are well known in the art and, accordingly, are not discussed in detail in the present disclosure.

Shown in FIG. 9 is a 2 inch by 4 inch guide beam 140 and a bearing assembly 142. Bearing assembly 142 includes an upper bearing plate 144 and a pair of lower side bearing plates 146. Upper bearing plate 144 is mounted to guide beam 140 by means of screws 148. A steel spacer 150 is welded to guide beam 140 at each of its upper corners, and lower side bearing plates 146 are secured to steel spacers 150 by screws 152. Conveyor slats CS slide on upper bearing plates 144, and are restricted from lateral movement somewhat by side bearing plates 146.

It is to be understood that many variations in size, shape, and construction can be made to the illustrated and above-described embodiment without departing from the spirit and scope of the present invention. Some of the features of the preferred embodiment may be utilized without other features. Therefore, it is to be understood that the presently described and illustrated embodiment is non-limitive and is for illustration only. Instead, my patent is to be limited for this invention only by the following claim or claims interpreted according to accepted doctrines of claim interpretation, including the doctrine of equivalence and reversal of parts.

What is claimed is:

1. A reciprocating floor conveyor, comprising:
    a support frame,
    a plurality of elongated conveyor slats carried on the support frame for longitudinal, reciprocating movement between "start" and "advanced" positions, a plurality of drive units, one for each conveyor slat, mounted on the support frame beneath the conveyor slats, for reciprocating the conveyor slats, each conveyor slat and drive unit including a set of longitudinally-spaced lugs, the conveyor slat lugs and drive unit lugs being alternately spaced apart in substantial longitudinal alignment, a set of contact blocks for each drive unit, each contact block being positioned between and in engagement with an adjacent pair of conveyor slat and drive unit lugs, each contact block being movable toward and away from a conveyor slat, whereby, as the drive units reciprocate the conveyor slats, should a conveyor slat move relative to its drive unit, the contact blocks will move to maintain engagement between the contact blocks and adjacent conveyor slat and drive unit lugs.

2. The reciprocating floor conveyor of claim 1, wherein each conveyor slat lug and drive unit lug includes downwardly-angled block engagement surfaces, and each contact block includes upwardly-angled lug engagement surfaces.

3. The reciprocating floor conveyor of claim 2, wherein each drive unit includes biasing means for each contact block for biasing the contact block upward into engagement with the block engagement surfaces of the conveyor slat and drive unit lugs.

4. The reciprocating floor conveyor of claim 3, wherein each drive unit includes one or more bars mounted to each drive shoe for supporting the contact blocks.

5. The reciprocating floor conveyor of claim 1, wherein each drive unit includes a hydraulic motor and a drive shoe mounted to the motor, the contact blocks being carried by the drive shoe.

6. The reciprocating floor conveyor of claim 5, wherein each conveyor slat includes a top portion and sidewalls depending from the lateral edges of the top portion, and wherein each drive shoe includes an upper portion and a pair of downwardly-depending sidewalls, the drive shoes adapted to fit underneath the conveyor slats with the drive shoe sidewalls spaced inwardly from the conveyor slat sidewalls, the conveyor slat lugs being attached to an inner side of each conveyor slat sidewall, and the drive unit lugs being attached to an outer side of each drive shoe sidewalls.

7. The reciprocating floor conveyor of claim 6, wherein the downwardly-depending sidewalls of the conveyor slats and drive shoes are angled laterally outwardly.

8. The reciprocating floor conveyor of claim 5, wherein each drive shoe is mounted to a hydraulic motor by a pair of C-shaped clamps bolted together.

9. The reciprocating floor conveyor of claim 8, wherein at least one of the C-shaped clamps include ridges, and the piston/cylinder motor includes matching ridges adapted to intermesh with the clamp ridges.

10. The reciprocating floor conveyor of claim 1, wherein the conveyor slats are carried on the support frame in a manner so that the conveyor slats can be lifted from the support frame and drive units without having to overcome mechanical fastener resistance.

11. A drive unit for reciprocating a conveyor slat of a reciprocating floor conveyor, the conveyor slat including a plurality of longitudinally-spaced lugs, the drive unit comprising:

an actuator having a plurality of longitudinally-spaced lugs, the conveyor slat lugs and the actuator lugs adapted to longitudinally align spaced from each other in an alternating arrangement, and a set of contact blocks adapted to fit within gaps between adjacent conveyor slat and actuator lugs, each contact block engaging both a conveyor slat lug and an actuator lug, the contact blocks adapted to move toward and away from the conveyor slat, whereby as the drive units reciprocate the conveyor slats, should a conveyor slat move relative to its drive unit, the contact blocks will move to maintain engagement between the contact blocks and adjacent conveyor slat and drive unit lugs.

12. The reciprocating floor conveyor of claim 10, wherein each conveyor slat lug and drive unit lug includes downwardly-angled block engagement surfaces, and each contact block includes upwardly-angled lug engagement surfaces.

13. The reciprocating floor conveyor of claim 12, wherein each drive unit includes biasing means for each contact block for biasing the contact block upward into engagement with the block engagement surfaces of the conveyor slat and drive unit lugs.

14. The reciprocating floor conveyor of claim 13, wherein each actuator includes one or more bars mounted to each drive shoe for supporting the contact blocks.

* * * * *